United States Patent

Breuer et al.

[15] 3,700,759
[45] Oct. 24, 1972

[54] MOLDING SUBSTANCES OF LOW- AND HIGH-PRESSURE POLYETHYLENE

[72] Inventors: Hans Breuer, Ludwigshafen/Rhine; Erich Manner, Burghausen-Upper Bavaria; Karl-Heinz Michl, Munich-Solln, all of Germany

[73] Assignee: Wacker-Chemie GmbH, Munich, Bavaria, Germany

[22] Filed: Oct. 26, 1970

[21] Appl. No.: 84,239

[30] Foreign Application Priority Data

Oct. 29, 1969 Germany..........P 19 54 488.8

[52] U.S. Cl. ..........................260/897 A, 260/23.5 R
[51] Int. Cl. ...............................................C08f 29/12
[58] Field of Search......................................260/897

[56] References Cited

UNITED STATES PATENTS

| 3,231,636 | 1/1966 | Snyder et al...............260/897 |
| 3,183,283 | 5/1965 | Reding......................260/897 |

FOREIGN PATENTS OR APPLICATIONS

| 827,363 | 2/1960 | Great Britain.............260/897 |

OTHER PUBLICATIONS

Boenig, " Polyolefins," 1966, pp. 51, 52, 71, 261.

*Primary Examiner*—Murray Tillman
*Assistant Examiner*—C. J. Seccuro
*Attorney*—Donald Malcolm

[57] ABSTRACT

A molding substance consisting of 90 to 99 percent by weight of low-pressure polyethylene with a density of 0.940 to 0.965 and a grader value of 0.05 to 0.3, and 1 to 10 percent by weight of high pressure polyethylene with a density of 0.918 to 0.930 and a grader value of 0.05 to 0.3.

1 Claim, No Drawings

MOLDING SUBSTANCES OF LOW- AND HIGH-PRESSURE POLYETHYLENE

It is known to mix low-pressure polyethylene and high pressure polyethylene in order to obtain molding substances with improved properties. In most instances about 40 to 70 percent by weight of low-pressure polyethylene are mixed with 30 to 60 percent by weight of high-pressure polyethylene. It has also been previously described how to use for foils, films or coatings — mixtures of polyethylene of high and low density with different melting indices and thus different molecular weights. However, the mixtures known so far frequently do not satisfy the requirements in their properties, for example with regard to toughness, notch sensitivity and flow properties. These faults appear particularly during the manufacture of stretch foils or films which are distinguished by great strength. It has been found that low-pressure polyethylene is best used for this purpose because of its relatively low raw material cost and its ease of processing, but that it is not fully satisfactory. Frequently the more expensive polypropylene is used instead.

We have now produced novel molding substances made of 90 to 99 percent by weight of low-pressure polyethylene with a density of 0.940 to 0.965 and a grader value of 0.05 to 0.3, and 1 to 10 percent by weight high-pressure polyethylene with a density of 0.918 to 0.930 and a grader value of 0.05 to 0.3.

It is surprising that the small quantities of high-pressure polyethylene used in accordance with our invention are at all compatible with low-pressure polyethylene. Moreover, these small quantities result in a considerable increase in the toughness and in the insensitivity to notch or nick tearing. Moreover, in spite of their low grader value, the substances have excellent flow properties.

The low-pressure polyethylene used can be manufactured in accordance with known methods, for example with the use of a Ziegler catalyst or in accordance with the Phillips method. However, it is important for obtaining the advantageous properties that the density of the low-pressure polyethylene should lie between 0.940 to 0.965 and the grader value between 0.05 and 0.3. The grader value, also called melting index $+i_2 +$ is determined in accordance with the provisions of ASTM D 1238 – 52 T.

Particularly good results are obtained when a low-pressure polyethylene is used which was produced in the presence of catalysts on the basis of compounds containing titanium tetrachloride and hydrogenated silicon compounds, e.g., H-siloxanes, perhaps with the addition of aluminum chloride.

Also, we obtain property improvements which should be stressed, when low-pressure polyethylene is used which has a broad molecular weight distribution. This broad molecular weight distribution can be obtained by mixtures of various types of low-pressure polyethylene, or one uses a product which has such a molecular weight distribution due to its production. As the measure for the breadth of the molecular weight distribution the non-uniformity $U = M_w/M_n - 1$ is given. Here $M_w$ designates the weight mean and $M_n$ the numerical mean of the molecular weight. In accordance with the present application, low-pressure polyethylene with a broad molecular weight is understood as a product which has a non-uniformity $U$ between 9 and 30.

As high-pressure polyethylene one can likewise use commercially available products made by known methods with a density of from 0.918 to 0.930, preferably 0.926 to 0.930 and a grader value from 0.05 to 0.3. Preferably used are 3 to 6 percent by weight high-pressure polyethylene with 94 to 97 percent by weight low-pressure polyethylene. These small additives of high-pressure polyethylene hardly change the advantageous mechanical properties of low-pressure polyethylene like bending strength, stiffness and hardness. On the other hand, the toughness and the insensitivity to notch tearing are greatly increased.

The molding substances of the invention can be produced in the known manner on mixing rollers or in extruders. Completely homogeneous mixtures are obtained. In addition one can also mix in with the molding substances the customary processing agents, like for instance stearates (aluminum, calcium and lithium stearate), fatty acid amides and stabilizing components, as for instance sterically hindered phenols, thioether, phosphates and furnace soot or lampblack.

These new mixtures can be used for numerous purposes. Their favorable properties are of particular importance in the manufacture of stretched foils.

The production of the foils can be carried out in accordance with the blow method as well as the flat film method. The flat film method has the advantage that higher output speeds are obtained. However, so far only low-pressure polyethylene could be processed which has a comparatively high grader value ($i_2 > 0.5$) in order to obtain a low-viscous melt. However, the molding substances of the invention, in spite of their grader value between 0.05 and 0.3, can be processed into flat films or foils due to their good flow properties.

The foils made in accordance with the blow method or the flat film method are subsequently subjected to a mono-axial stretching process. They can also be cut in advance into narrow foils, so-called small bands, and stretched only afterward. The stretching is done under heating up to slightly below the crystalline melting point. Here the foils can be stretched from the molding substances of the invention by several times their original length up to a stretching degree from 1 to 9. Of decisive importance for the toughness of the foils or small bands, besides the material used and the processing conditions, is a large stretching proportion.

Technically the foil-stretching process is carried out after heating just below the crystalline melting point, being carried over two cylinders rotating at different speeds, thus being stretched mono-axially in the direction of the longitudinal axis. The proportion of the rotating speeds determines the degree of stretch.

The clearance between the two cylinders is the zone within which the stretching is carried out. The foils of low-pressure polyethylene with higher grader values ($i_2 > 0.5$) form only a small stretch zone (a few millimeters), so that the stress on the material is very great. Particularly when the original foil contains unplasticized particles like pigment inclusions or bubbles, strangulations and tearings of the foil will occur. However, when the foils are formed of molding substances with a low grader value, as represented by the mixtures of our invention (formerly such foils were accessible only through expensive blowing processes), the stretch zone on the small band or on the foil can be up to 80 mm. In this manner the stretch of the polyethylene during the stretching process is smaller. The material has a longer time to equalize non-stretchable spots caused by a greater stretching of other parts. The strangulations get less deep and cause tearing less frequently. Moreover, the molding substances of the invention show great toughness, so that foils made from them have a great insensitivity to notch tearing.

For carrying out the stretch process practically this has the advantage that one can work with high cylinder speeds without causing a tear or disruption of the stretching process; moreover, large stretch proportions are feasible technically and result in foils of great toughness. Thus for instance one can produce small bands with a toughness of 5.5 to 6 g/den. These are very well suited, for making woven packing bags.

Also, the substances of the invention are useful for making stretched fibers.

EXAMPLE 1

95 parts by weight low-pressure polyethylene with a density of 0.954, a grader value of 0.1 (produced in the presence of a catalyst on the basis of titanium tetrachloride, aluminum chloride and H-siloxanes) are mixed together with 5 parts by weight of a high-pressure polyethylene polymerizate with a density of 0.926 to 0.930 and a grader value of 0.1 to 0.3 for 10 minutes at 175° C on a rolling mill. The coating removed from the roller and cooled, is granulated and pressed in a press at 175° C into a sheet 1 mm thick. Samples stenciled out from this sheet are subjected to a toughness test according to DIN 53 448 and result in values of 200 – >cmkp/cm². Samples taken from sheets made under the same conditions and the same original polyethylene, but without addition of the high-pressure polyethylene, give values of 110 – 120 cmkp/cm².

Table 1 shows the measuring results as compared with pure low-pressure polyethylene.

TABLE 1

| | Low-pressure PE | Mixture 95% low-pressure PE + 5% high-pressure PE |
|---|---|---|
| Density (23° C) g/cm³ | 0.954 | 0.952 |
| $i_2$ value (ASTM D 1238–52 T) g/10 min | 0.1 | 0.1 |
| tensile strength (DIN 53 455) kp/cm² | 250. | 240. |
| resistance to tearing kp/cm² | 250. | 350. |
| tearing stretch % | 800–900 | 900–1000 |
| Shore D (DIN 53 505) | 62. | 61. |
| notch impact tensile strength (DIN 53 448) cmkp/cm² | 110–120 | 200–220 |

EXAMPLE 2

A mixture of 95 parts by weight of low-pressure polyethylene with a density of 0.954, and a grader value of 0.1, and 5 parts by weight of a high-pressure polyethylene with a density of 0.923 – 0.924 and a grader value of 1.2 – 1.7 is made as in Example 1. From the mixture a pressed sheet 1 mm thick is pressed. Samples stenciled out from it show toughness values of 140 cmkp/cm² in accordance with DIN 53 448. The values in Table 2 show that high-pressure polyethylene with a high grader value gives only slight improvements.

TABLE 2

| | Low-pressure PE | Mixture 95% low-pressure PE + 5% high-pressure PE |
|---|---|---|
| Density (23° C) g/cm³ | 0.954 | 0.951 |
| $i_2$ value (ASTM D 1238–52 T) g/10 min | 0.1 | 0.1 |
| tensile strength (DIN 53 455) kp/cm² | 250. | 230–240 |
| resistance to tearing kp/cm² | 250. | 280–300 |
| tearing stretch % | 800–900 | 900–1000 |
| Shore D (DIN 53 505) | 62 | 61 |
| notch impact tensile strength (DIN 53 448) cmkp/cm² | 110–120 | 140 |

EXAMPLE 3

Mixtures of low-pressure polyethylene with a density of 0.954, a grader value of 0.1 with 5 parts by weight of a high-pressure polyethylene with a density of 0.918 and a grader value of 0.1 to 0.3 are prepared as in Example 1, pressed into a sheet 1 mm thick and subjected to a toughness test as per DIN 53 448. The toughness values found are 180 – 190 cmkp/cm².

TABLE 3

| | Low-pressure PE | Mixture 95% low-pressure PE + 5% high-pressure PE |
|---|---|---|
| Density (23° C) g/cm³ | 0.954 | 0.951 |
| $i_2$ value (ASTM D 1238–52 T) g/10 min | 0.1 | 0.1 |
| tensile strength (DIN 53 445) kp/cm² | 250. | 240. |
| resistance to tearing kp/cm² | 250. | 350. |
| tearing stretch % | 800–900 | 900–1000 |
| Shore D (DIN 53 505) | 62 | 61 |
| notch impact tensile strength (DIN 53 448) cmkp/cm² | 110–120 | 180–190 |

EXAMPLE 4

A mixture of 96 percent low-pressure polyethylene with a density of 0.957 and a grader value of 0.3, and a high-pressure polyethylene, 4 percent, with a density of 0.926 to 0.930 and a grader value of 0.1 to 0.3 was mixed in a rolling mill as in Example 1. Thereafter a sheet 1 mm thick was made and the following mechanical values were determined.

TABLE 4

| | Low-pressure PE | Mixture 95% low-pressure PE + 4% high-pressure PE |
|---|---|---|
| Density (23° C) g/cm³ | 0.957 | 0.954 |
| $i_2$ value (ASTM D 1238–52 T) g/10 min. | 0.3 | 0.3 |
| tensile strength (DIN 53 455) kp/cm² | 270. | 270. |
| resistance to tearing kp/cm² | 200. | 300. |
| tearing stretch % | 600–700 | 700–800 |
| Shore D (DIN 53 505) | 64 | 64 |
| notch impact tensile strength (DIN 53 448) cmkp/cm² | 90–100 | 170 |

EXAMPLE 5

A low-pressure polyethylene with a non-uniformity of 10, a grader value of 0.15 and a density of 0.945 is mixed with a high-pressure polyethylene with a density of 0.926 to 0.930 and a grader value of 0.1. The following mechanical values are measured on sheets 1 mm thick made from this mixture.

TABLE 5

| | Low-pressure PE | Mixture 96% low-pressure PE + 4% high-pressure PE |
|---|---|---|
| Density (23° C) g/cm³ | 0.945 | 0.944 |
| $i_2$ value (ASTM D 1238-52 T) g/10 min | 0.15 | 0.16 |
| tensile strength (DIN 53 455) kp/cm² | 240. | 240. |
| resistance to tearing kp/cm² | 300. | 350. |
| tearing stretch % | 800–900 | 900–1100 |
| Shore D (DIN 53 505) | 60 | 60 |
| notch impact tensile strength (DIN 53 448) cmkp/cm² | 130 | 210–220 |

EXAMPLE 6

The mixture made in accordance with Example 1 was extruded through a wide-slit nozzle into flat foils 250 to 300 μ thick and thereafter the foils were stretched in a stretching device to a stretch proportion of 1 : 8.3 with a thickness of 35 to 38 μ. Table 6 shows a comparison between the notch tear sensitivity determined on the original foil, expressed in the work required for further tearing, and the strength obtained in the stretched foil — with the values determined on customary low-pressure PE materials.

TABLE 6

| | Low-pressure PE 1 | Low-pressure PE 2 | Mixture 95% low-press. PE +5% high press. PE |
|---|---|---|---|
| Density (23° C) g/cm³ | 0.946 | 0.942 | 0.952 |
| $i_2$ value (ASTM D 1238-52 T) | 0.45 | 0.5 | 0.1 |
| work for further tearing* cmkp/cm² (in the pull-off direction of the foil) | 190 | 180 | 280 |
| degree of stretch | 1 : 7.5 | 1 : 7 | 1 : 8.3 |
| strength in pond/denier | 4.5 | 4.3 | 5.6–6.0 |

*The tests of further tearing are made on pieces of foil 15 mm wide, into which 5 mm deep one-side cuts were made by a razor blade or stencil, in the impact pendulum. If the samples are notched only on one side and with the smallest possible radius in the notch base, during the subsequent impact tension test a tear spreads at a great spreading speed, whose measured work for further tearing gives a good measure for the insensitivity of the material against tear spreading.

The invention claimed is:

1. A molding substance consisting of 94 to 97 percent by weight of low-pressure polyethylene produced in the presence of catalysts containing titanium tetrachloride and hydrogenated silicon compounds with a density of 0.940 to 0.965, a grader value of 0.05 to 0.3 and a non-uniformity between 9 and 30, and 6 to 3 percent by weight high-pressure polyethylene with a density of 0.918 to 0.930 and a grader value of 0.05 to 0.3.

* * * * *